Aug. 10, 1965
D. W. WAGNER
3,200,324
ROTATING ELECTRICAL MACHINE WITH MULTIPLE
ROTORS IN PAIRED RELATION
Filed Feb. 29, 1960
2 Sheets-Sheet 1
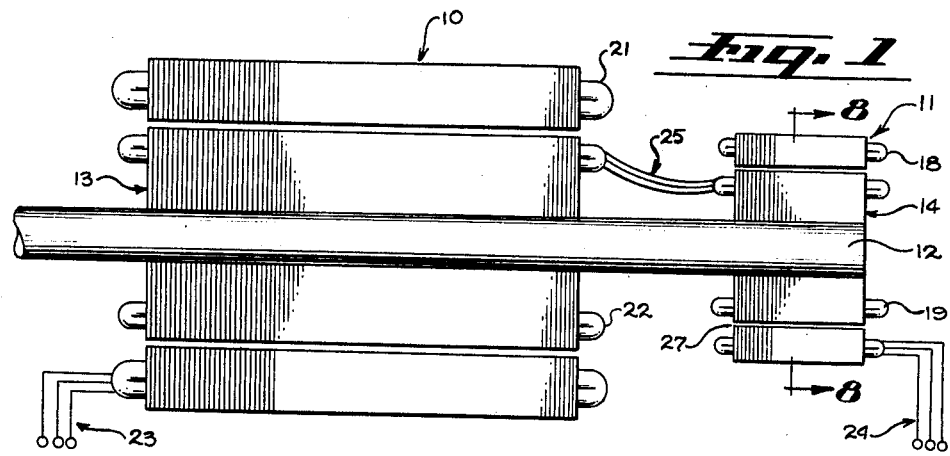
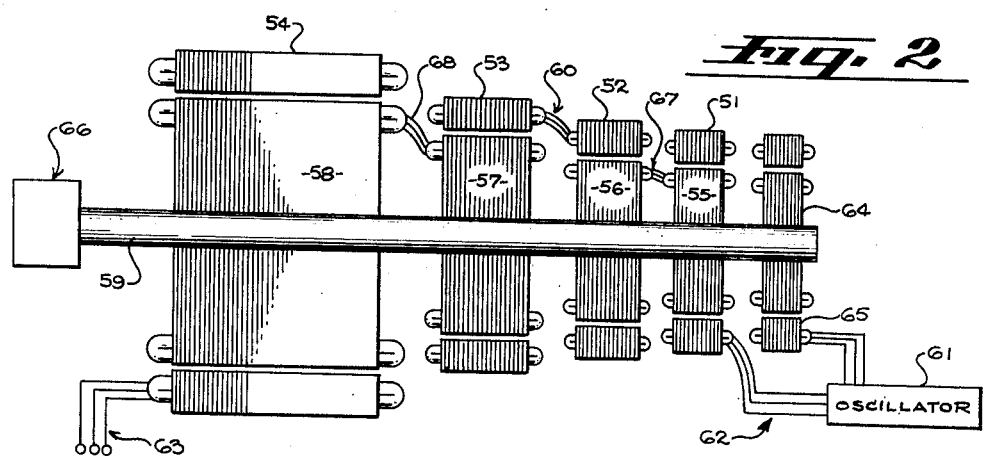
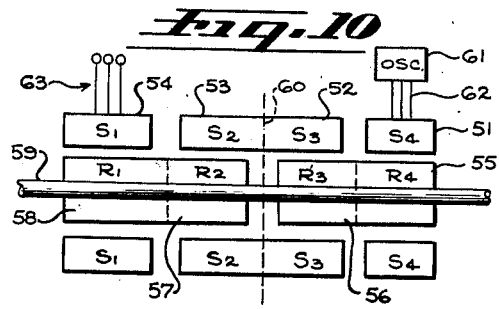
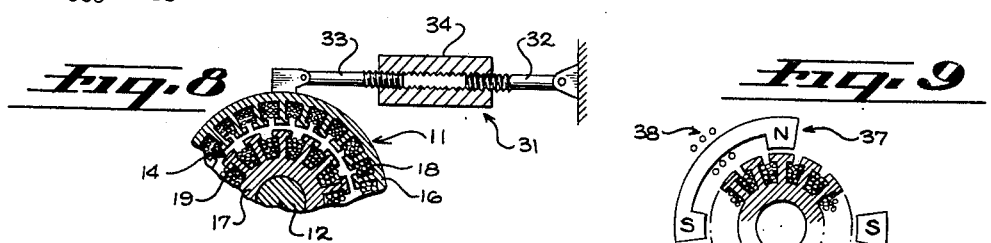
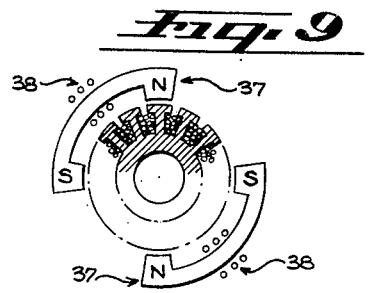
DUDLEY W. WAGNER
INVENTOR
BY
ATTORNEYS

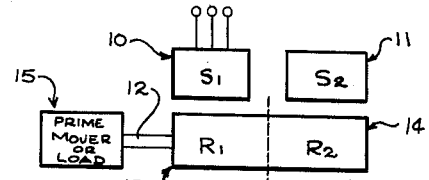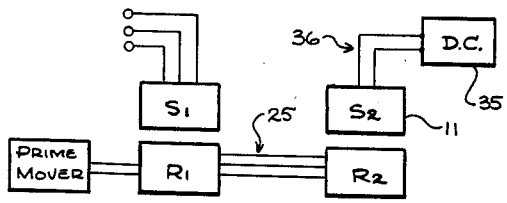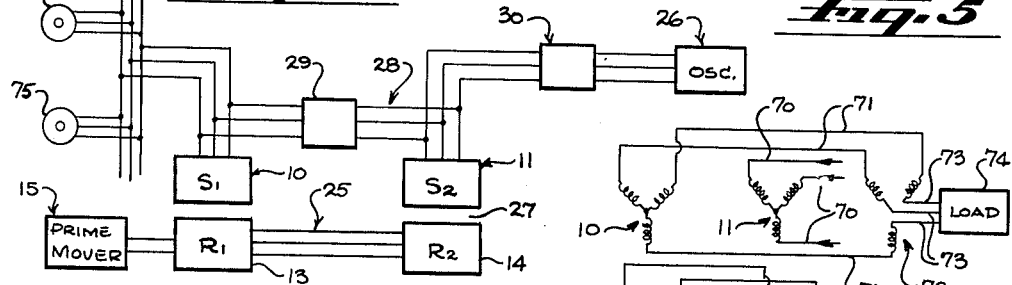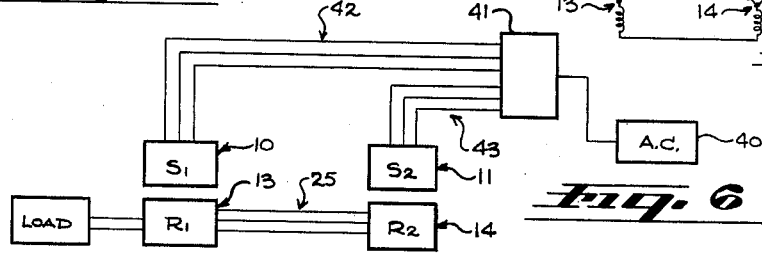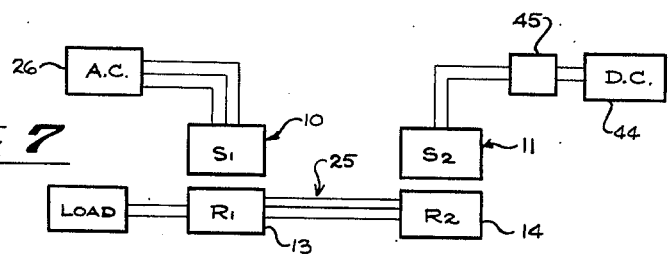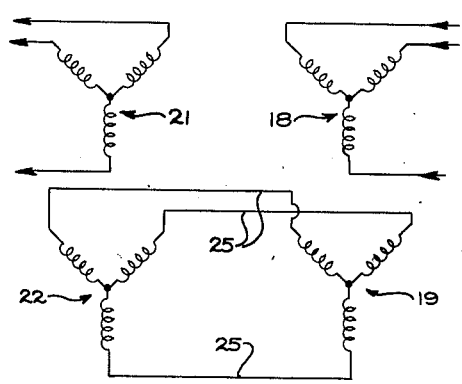
DUDLEY W. WAGNER
INVENTOR United States Patent Office 3,200,324
Patented Aug. 10, 1965

3,200,324
ROTATING ELECTRICAL MACHINE WITH
MULTIPLE ROTORS IN PAIRED RELATION
Dudley W. Wagner, 220 Grandview, Laguna Beach, Calif.
Filed Feb. 29, 1960, Ser. No. 11,641
13 Claims. (Cl. 322—32)

This invention relates generally to rotary electrical equipment such as generators or alternators, and motors, and more particularly concerns a novel alternator or motor characterized in the provision of multiple rotor portions electrically interconnected in paired relation to directly transfer current therebetween.

As will appear, different applications of the invention accommodate its wide use as for example as an asynchronous alternator as well as a synchronous alternator, as an induction motor and a synchronous motor. Among the objects of the invention are included the provision of a novel alternator or motor of simple lightweight construction in which the use of brushes, slip rings and commutation equipment is obviated, by directly interconnecting the rotor portions, as for example the exciter rotor and the rotor for the power output generator. This removes the necessity of incorporating rectifier elements mechanically attached to the rotating structure.

Other objects of the invention include the provision of alternators in which the output frequency is independent of the shaft rotational speed over a wide range of shaft speeds, a brushless alternator machine that produces output voltage and frequency which may be manually or automatically controlled, and an alternator which inherently tends to overcome the normal characteristic of such a device to produce increased output voltage with constant load as shaft speed increases.

Still another object of the invention is to provide an alternator the electrical excitation power of which can be minimized by the addition of rotor-stator combinations mounted concentrically in pairs and distributed along a common shaft, no rectifiers being necessary. Provision may be made for positive feedback to reduce still further the input excitation power requirements, as will be brought out.

Finally, it is an object of the invention to provide a brushless synchronous alternator having an unusually low synchronous speed, a result of the unique relationship between the number of poles in the output stator winding and the frequency generated.

These and other objects and advantages of the invention, as well as the details of an illustrative embodiment, will be more fully understood from the following detailed description of the drawings, in which:

FIG. 1 is a general view taken in cross sectional elevation showing the rotary electrical equipment operating as an alternator;

FIG. 2 is a view like FIG. 1 excepting that it is more generalized in that several mechanically and electrically interconnected alternator stages are shown;

FIG. 3 is a schematic showing of the basic form of the invention;

FIG. 4 is a schematic view like FIG. 3 excepting that the rotary equipment is operating as an asynchronous alternator;

FIG. 5 is like FIG. 3 with the rotary equipment operating as a synchronous alternator;

FIG. 6 is like FIG. 3 with the rotary equipment operating as an induction motor;

FIG. 7 is like FIG. 3 with the machine operating as a synchronous motor;

FIG. 8 is a cross section taken on line 8—8 of FIG. 1;

FIG. 9 is a view like FIG. 8 excepting that permanent magnets are shown as the stator portions of the exciter;

FIG. 10 is a view like FIG. 3 excepting that several stages of stator and rotor portions interconnected electrically and mechanically are shown, the equipment operating as an asynchronous alternator;

FIG. 11 is a circuit diagram for the equipment shown in FIGS. 1 and 4; and

FIG. 12 is a diagram like FIG. 11 with the provision of series feedback.

Referring first to FIGS. 1 and 8, the electrical equipment comprises a pair of stators or stator portions 10 and 11, these also being indicated in FIG. 3. Mounted for rotation within the stator portions by a central shaft 12 are the two rotor portions 13 and 14. The two rotor portions 13 and 14 could be mounted on separate shafts interconnected for rotation by means not shown, such as gearing, and this also would comprise a rotor assembly within the contemplation of the invention. When the machinery is operating as an alternator, a prime mover shown generally at 15 in FIG. 3 rotates the shaft 12, whereas when the equipment is operating as a motor the shaft 12 rotates a load also indicated at 15 in FIG. 3.

The stators and rotors shown in FIGS. 1 and 8 are made up of stacked laminations 16 and 17 constructed in the usual manner with lengthwise extending slots 18 and 19 containing windings running back and forth through circularly spaced slots and thereby determining the pole configuration of the apparatus according to known principles. The stator and rotor windings for the power generator portions of the apparatus of FIG. 1 are indicated at 21 and 22 in FIG. 1, and the power output leads interconnected with the stator windings are shown generally at 23. The excitation input leads to the stator 11 of the exciter portion of the apparatus are shown generally at 24.

In accordance with the principles of the invention, the windings of the rotors 13 and 14 are directly electrically interconnected to transfer current therebetween, the interconnection wires being indicated at 25. When an external electric oscillator or low power source of alternating current indicated at 26 in FIG. 4 is used to energize the stator winding 11 of the exciter generator for asychronous operation, a rotating magnetic flux of determinate number of poles results in the annular air gap 27 between the rotor and stator of the exciter generator. Accordingly, with the shaft stationary, the rotating flux in the air gap of the exciter generator will induce a voltage in the rotor winding of frequency equal to the oscillator frequency. Now, if the shaft is rotated in the same direction as the flux, but at a speed less than that of the flux, the frequency of the induced voltage will be $$f_2 = f_1 = \frac{\omega P_e}{120} \qquad \text{Equation 1}$$

where $f_1$=oscillator frequency, c.p.s.
$\omega$=shaft speed in r.p.m.
$P_e$=number of poles in exciter generator winding As $\omega$ increases, the voltage induced in the exciter rotor decreases, which in turn decreases the excitation of the power generator rotor, thereby lowering the voltage induced in the power generator stator winding. The exciter generator rotor, if disconnected from its load, will produce a relatively constant voltage to frequency ratio. Thus, the inherent tendency of the power generator to increase its voltage output as shaft speed increases is offset by novel control of the power generator excitation. When $\omega$ equals the rotational speed of the stator flux of the exciter generator, essentially all excitation will cease, and the machine will no longer generate.

It will be noted that the exciter generator operates essentially as an induction motor, supplying slip frequency power to the rotor of the power generator, while at the same time supplementing the prime mover in its function to rotate the shaft.

The frequency of the output from the power generator stator is expressed by the relationship $$f_3 = f_2 + \frac{\omega P_p}{120} \quad \text{Equation 2}$$

where $f_3$=stator output frequency, c.p.s.
$f_2$=power generator rotor frequency, c.p.s. (see Equation 1)
$\omega$=shaft speed in r.p.m.
$P_p$=number of poles in power generator winding It will be noted that the electrical connections between the two rotor windings are made in such a way that the power generator rotor flux will revolve in the same direction as the shaft.

Combining Equation 2 and Equation 1.

$$f_3 = f_1 - \frac{\omega P_e}{120} + \frac{\omega P_p}{120}$$

$$= f_1 + \frac{\omega}{120}(P_p - P_e)$$

When $P_p = P_e$, then $f_3 = f_1$, and we have a machine whose output frequency is independent of shaft speed, subject to the restrictions formerly discussed, i.e.

$$0 < \omega < \frac{120}{P_e} f_1$$

Accordingly, the rotary load means such as motors 75 shown in FIG. 4 may be speed controlled independently of the shaft speed of the prime mover 15.

Since $f_3 = f_1$, it will be possible to feed a portion of the output power (properly phase shifted) back to the exciter generator stator, resulting in a low auxiliary excitation input power requirement. Phase shifting may be accomplished conveniently by rotating physically the exciter generator stator to an appropriate position. Automatic and/or manual voltage regulation features may be provided in the oscillator package.

The electrical connections for shunt feeding a portion of output power back to the exciter generator stator are shown in FIG. 4 at 28, an optional transfer device 29 being inserted in series with these feed back connections for controlling feed back application. Likewise, an optional transfer device 30 is shown in series with the connections between the oscillator 26 and the exciter stator 11 for controlling application of external alternating current to the stator 11. Phase shifting apparatus is indicated generally at 31 in FIG. 8. This includes a fixed arm 32, an arm 33 connected to the stator which is mounted for rotation, and a device such as a turnbuckle 34 having threaded connection with the arms 32 and 33 for controlling the rotary location of the stator 11 in space.

Referring now to FIG. 12, the circuit shown corresponds to the schematic showing of FIG. 4, the rotor portions 13 and 14 and the stators 10 and 11 having three phase windings as illustrated. The rotor portion windings are directly interconnected to transfer alternating current therebetween, as has been discussed. The exciter stator 11 receives exciting alternating current through input leads 70, from a source, not shown, but which is indicated generally at 26 in corresponding to FIG. 4.

Other leads 71 transfer, by series feedback, at least some of the output from stator 10 to an additional three phase winding 72 in the exciter stator 11. The other terminals of the winding 72 are not interconnected, but are separately connected by leads 73 with the load 74, as shown.

As a result, increasing current demands of the load result in increasing excitation of the rotor portion 13 for achieving desired regulation.

Referring now to FIG. 5, showing application of the invention to synchronous alternator application, the stator 11 is energized by a direct current source shown at 35, electrical connections being indicated at 36. In this application of the invention, the exciter stator may consist of a salient pole structure with D.C. windings, or a salient pole structure with permanent magnets shown generally in FIG. 9 at 37, with D.C. windings 38 optionally provided, or a distributed D.C. winding in slotted laminations, or a distributed A.C. type winding in slotted laminations but D.C. excited.

Unlike the condition necessary for asynchronous operation, synchronous use permits the number of power generator poles to differ from the number of exciter generator poles. The expression for frequency delivered by the exciter generator rotor is $$f_4 \frac{\omega P_e}{120} \quad \text{Equation 3}$$

where $\omega$=shaft speed in r.p.m.
$P_e$=number of poles in exciter generator

The power generator stator frequency is sensitive to the algebraically combined effects of the rotational velocity of the power generator rotor and the rotational velocity of the rotor-produced flux about the rotor. The expression for the output frequency of the power generator stator is $$f_5 = f_4 \pm \frac{\omega P_p}{120} \quad \text{Equation 4}$$

where $\omega$=shaft speed in r.p.m.
$P_p$=number of poles in power generator

Combining Equation 3 and Equation 4, the output frequency is:

$$f_5 = \frac{\omega P_e}{120} \pm \frac{\omega P_p}{120} = \frac{\omega}{120}(P_e \pm P_p)$$

The plus-or-minus notation appears because the interconnection between the two rotor windings can be made for either of two distinct phase sequences. It is readily apparent that a wide variety of pole combinations is possible, with an attendent unusually large choice of synchronous speeds.

Referring now to FIG. 6, the rotary electrical equipment is shown operating as an induction motor. In this instance A.C. power from an external source 40 is optionally fed through a switch 41 and connections 42 or 43 to either of the stators 10 and 11, the rotors 13 and 14 being of wound type as previously discussed. Thus, where power is fed to the stator 10, the rotor 14 will provide an electrical load for the winding of rotor 13, or alternatively where power is fed to the stator 11, the winding of the rotor 13 will provide an electrical load for current developed in the winding of the rotor portion 14.

If pole combinations are selected properly according to known principles, and the rotor windings are interconnected properly, both stators 10 and 11 may be energized from the source 40, with resultant induction motor operation.

Referring now to FIG. 7, the basic equipment is shown operating as a synchronous motor, and in this instance direct current is applied from a source 44 through a switch 45 to the stator 11. Here, the stator is assumed to comprise one of the forms described above in connection with synchronous alternator operation. Also, alternating current is supplied from an external source 26 to the stator 10 for starting the machine as an induction motor with no D.C. excitation, and when D.C. excitation is supplied the motor will operate as a synchronous motor. This operation can be carried out immediately as desired. Also, the machine may be operated as a synchronous motor with the application of alternating current voltage to the stator 11, the selection of pole combination, applied frequencies, and rotor interconnections, determining the synchronous shaft speed.

Referring to FIGS. 2 and 10, stator portions 51 through 54 are shown with corresponding rotor portions 55 through 58, the rotor portions being mounted on a common shaft 59. For purposes of description, the stators 51 and 52 comprise one pair while stators 53 and 54 comprise another pair so that the stator portions in each pair are mutually electrically disconnected as illustrated. On the other hand, the stator portions 52 and 53 are electrically interconnected at 60, and the stator portion 51 is supplied with alternating current from a source 61 through connection 62 as shown. In this example all of the stators and rotors are wire wound.

It is clear that the rotor and stator portion combination 51 and 55 operates as an exciter for the rotor and stator portions 52 and 56, power output from the latter being fed from the connection at 60 to the stator 53. The stator 53 and the rotor 57 act as another exciter for the terminal power generator unit including the stator 54 and the rotor 58, the output terminal for the stator 54 being indicated at 63. Input power for the initial exciter stator 51 may be derived from a generator and including a rotor 64 and stator 65, the output from which is fed to the oscillator 61. Shaft 59 is of course driven by prime mover generally indicated at 66. The elements discussed are shown schematically at FIG. 10, illustrating that the rotor portions 55 and 56 may comprise a single rotor and the rotor portion 57 and 58 may also comprise a single rotor since they are electrically interconnected. These interconnections are shown at 67 and 68 in FIG. 2. Finally, the stator portions 52 and 53 in FIG. 10 are shown as one since they are electrically connected.

Referring now to FIG. 11, the three phase windings for the rotors and stators shown in FIGS. 1 and 4, are indicated at 18, 19, 21 and 22, the interconnections between the rotor windings 19 and 22 comprising the leads 25 as illustrated.

I claim:

1. In rotary electrical equipment, multiple stator portions, and a rotor assembly including multiple rotor portions one for each stator portion, and means mounting the rotor portions to rotate simultaneously in electromagnetic energy transferring relation with the stator portions, said rotor portions being electrically interconnected in paired relation to transfer directly alternating current therebetween, at least two stator portions being electrically interconnected in power transferring relation, and other means to supply external current to only one of said multiple stator portions.

2. The invention as defined in claim 1 including other means for withdrawing electrical current from one of the stators during transfer of electromagnetic energy from the other stator to the rotor assembly in response to rotation of said rotor assembly whereby said equipment operates as a current generator.

3. The invention as defined in claim 1 including other means for introducing electrical current into at least one of the stators, the rotor portion for said one stator having an induction motor winding, whereby said equipment operates as a motor.

4. In rotary equipment for generating electrical current, power and exciter stators, a rotor assembly including multiple rotor portions one for each stator, shaft means mounting the rotor portions to rotate simultaneously in electromagnetic energy transferring relation with the stators, the rotor portions being electrically interconnected in paired relation to transfer directly alternating current from a rotor portion for the exciter stator to a rotor portion for the power stator, means for withdrawing electrical current from the power stator during transfer of electromagnetic energy from the exciter stator to the rotor for the exciter stator in response to rotational input to the rotor assembly, said stators being electrically connected, and other means to supply external current to only one of said stators.

5. The invention as defined in claim 4 in which the exciter stator is wire wound, and said other means includes input means connectible with the exciter stator winding for producing a magnetic field that rotates in the direction of rotor assembly rotation and the flux of which links the rotor portion for the exciter stator.

6. The invention as defined in claim 5 in which said input means includes a source of alternating current.

7. The invention as defined in claim 5 in which the power and exciter stators have the same number of poles.

8. The invention as defined in claim 5 in which said rotor portions are wire wound.

9. The invention as defined in claim 5 including means mounting the exciter stator for rotary adjustment about the rotor assembly thereby to shift the phase of electromagnetic energy transfer to the rotor assembly.

10. The invention as defined in claim 4 in which the exciter stator is wound, and including input means electrically connectible with the exciter stator winding for transmitting direct current thereto thereby to create flux linking the rotor portion for the exciter stator.

11. The invention as defined in claim 4 in which the exciter stator includes permanent magnets to create flux linking the rotor portion for the exciter stator.

12. The invention as defined in claim 7 including an additional winding in the exciter stator, and means for feeding at least some of the electrical output from the power stator through said additional winding to an external load, whereby increasing load demand results in increased excitation of the rotor portion for the power stator.

13. The invention as defined in claim 7 including prime mover means for driving said rotor assembly at constant speed ratio in relation to the prime mover speed, and rotary load means to which current withdrawn from the power stator is delivered for rotating said rotary load means at speeds controlled by the frequency of current delivered by said input means to the exciter stator, and independently of prime mover speed.

References Cited by the Examiner

UNITED STATES PATENTS

| | | | |
|---|---|---|---|
| 999,987 | 8/11 | Goldschmidt | 322—47 |
| 2,659,044 | 11/53 | MacNeil. | |
| 2,831,156 | 4/58 | Mathews et al. | |
| 2,886,762 | 5/59 | Polasek | 322—47 |
| 2,903,641 | 9/59 | Roe | 322—32 |

LLOYD McCOLLUM, *Primary Examiner.*

MILTON O. HIRSHFIELD, *Examiner.*